Figure 1:
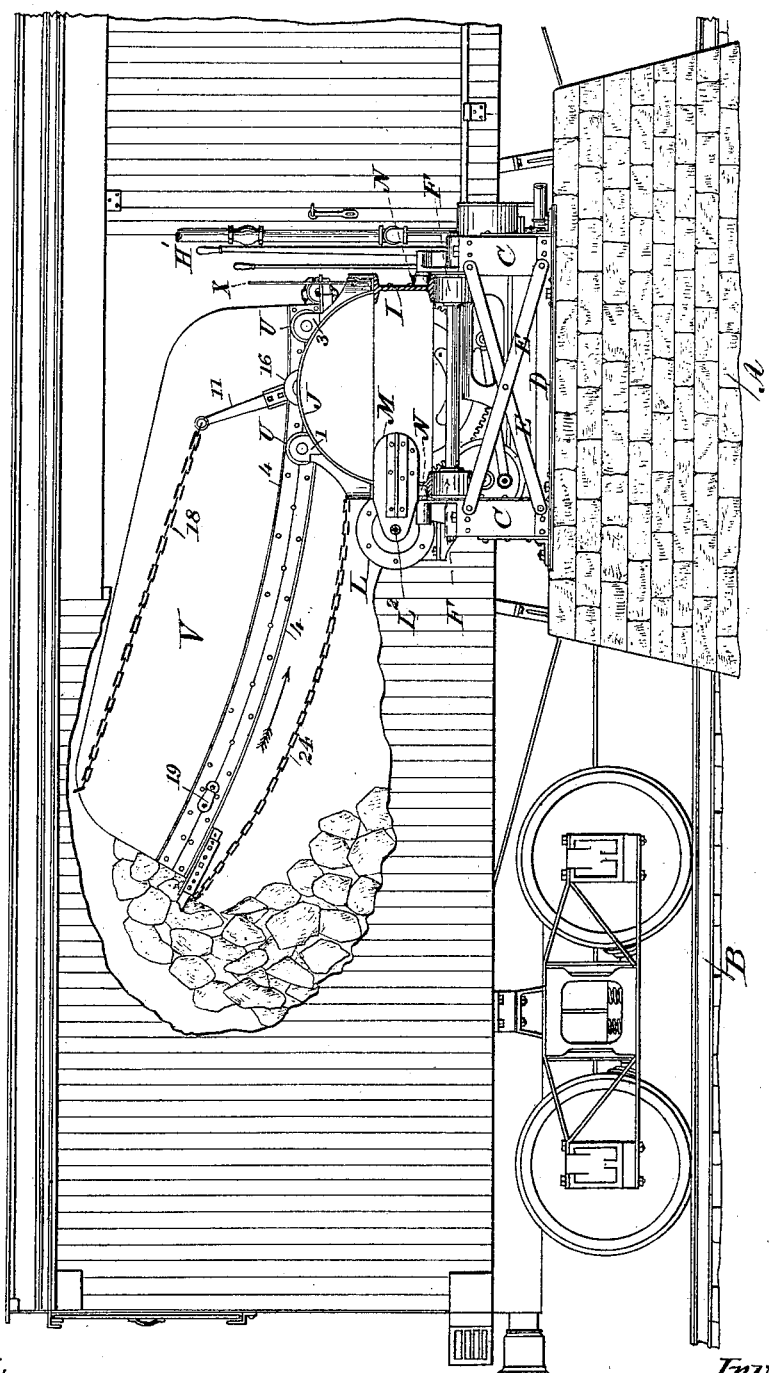

No. 632,202. Patented Aug. 29, 1899.
H. PHILLIPS & W. HUNT.
CAR LOADER.
(Application filed Dec. 22, 1898.)
(No Model.) 6 Sheets—Sheet 1.

Witnesses: Inventors
F. C. Brecht Henry Phillips
John Tyler Wm. Hunt.
By Wm. C. McIntire, Attorney.

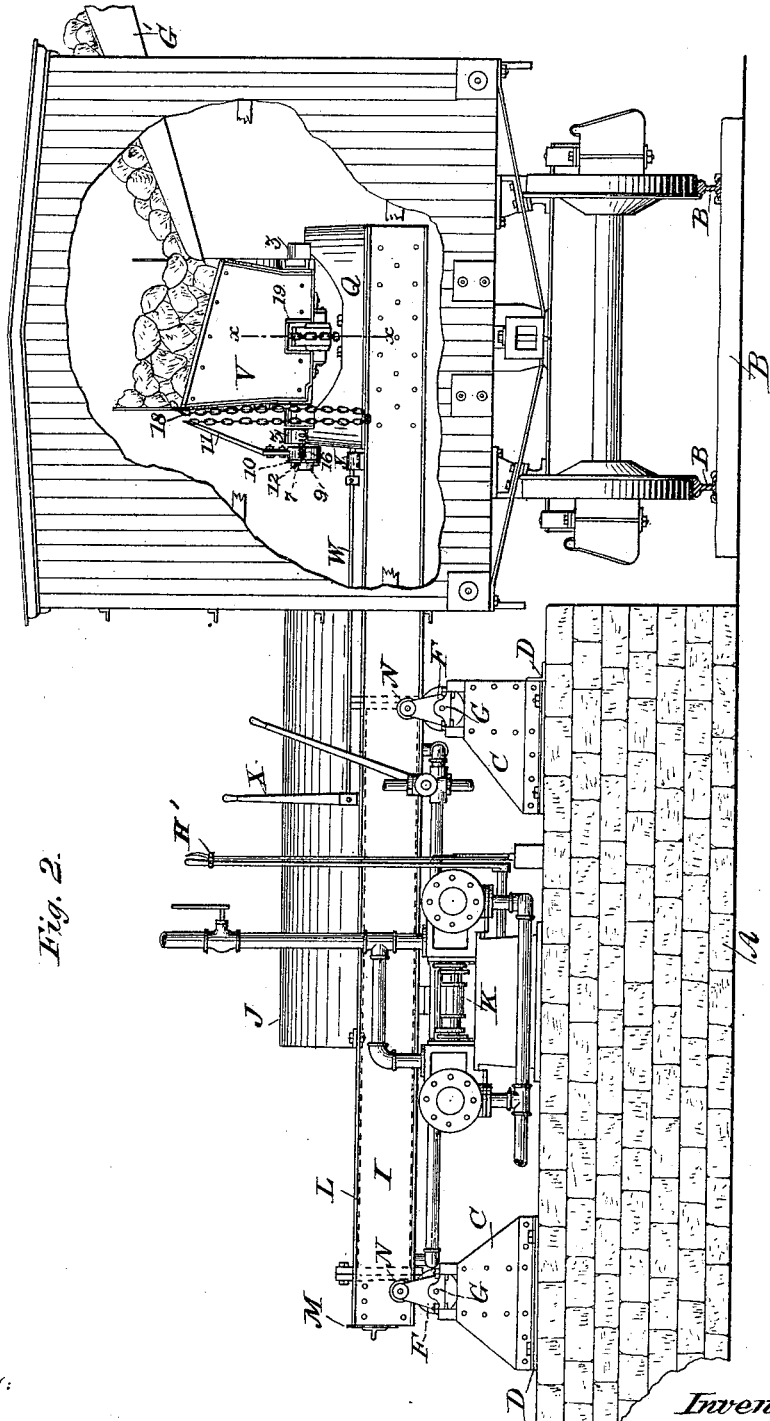

No. 632,202. Patented Aug. 29, 1899.
H. PHILLIPS & W. HUNT.
CAR LOADER.
(Application filed Dec. 22, 1898.)
(No Model.) 6 Sheets—Sheet 3.
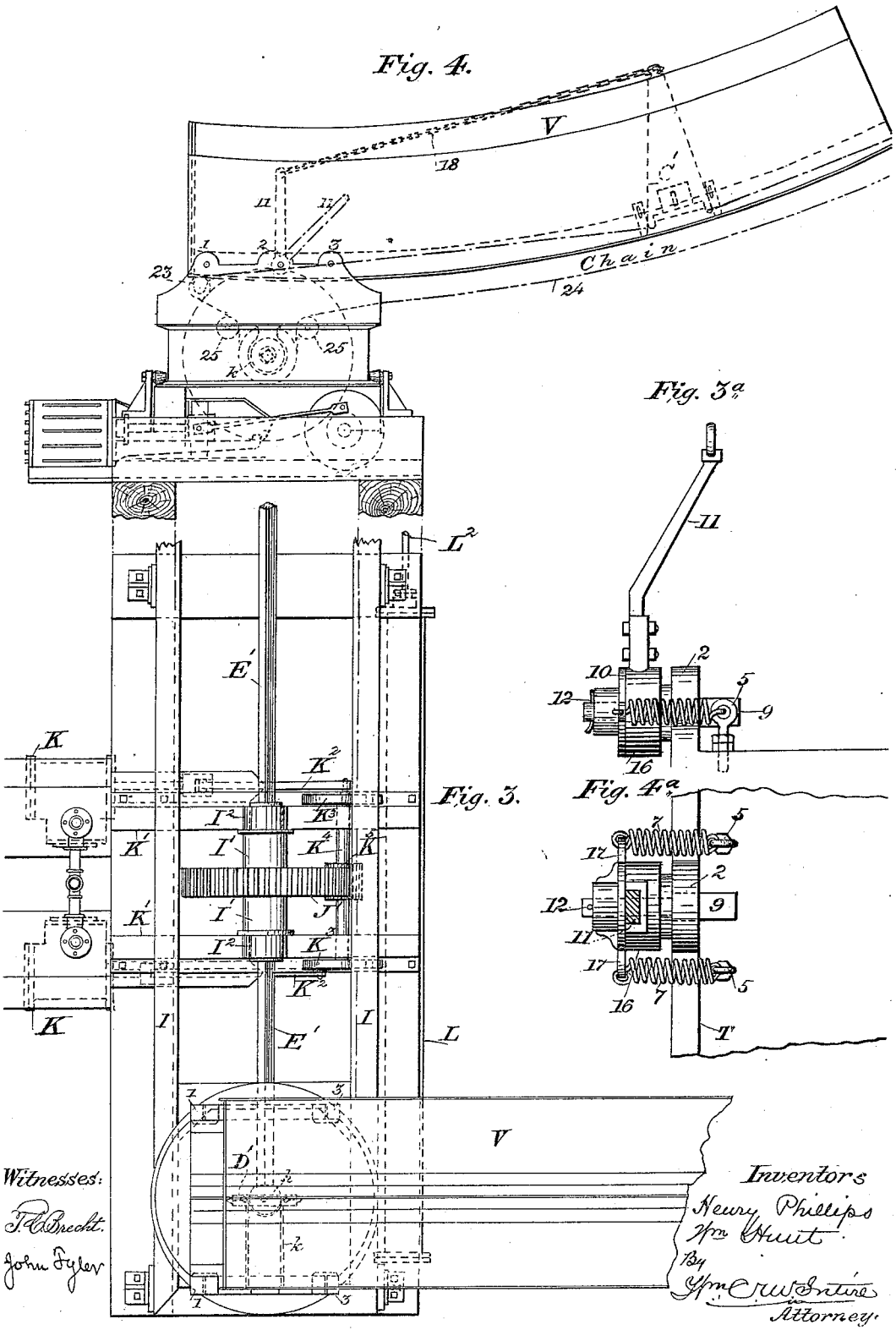

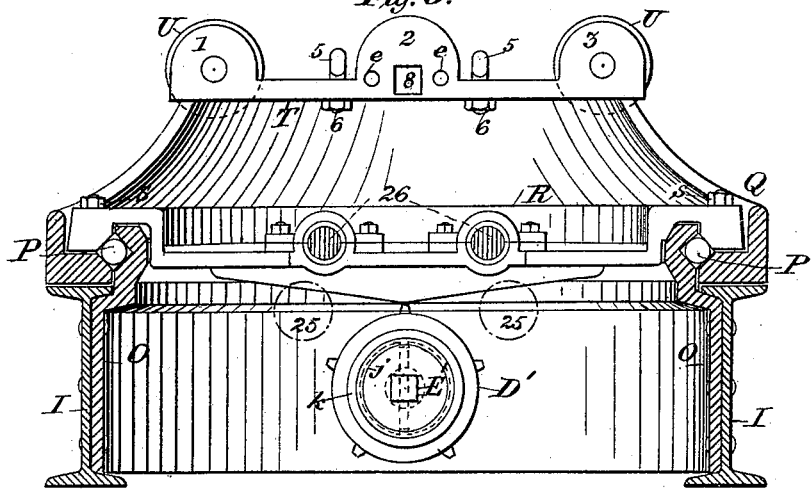
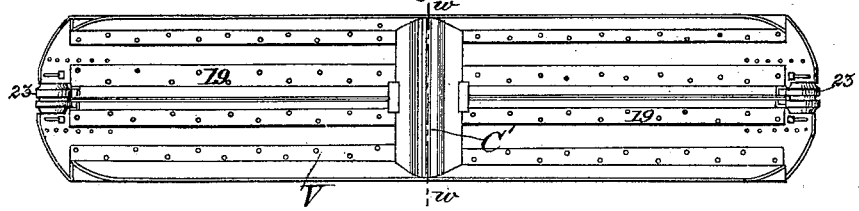
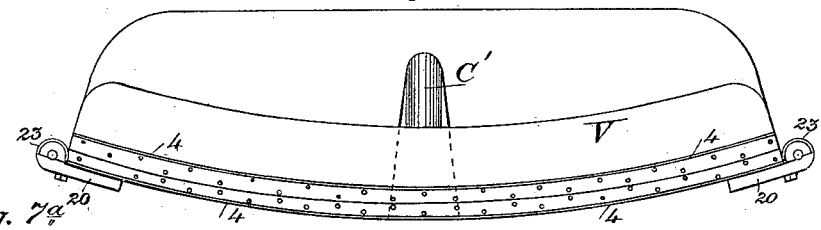
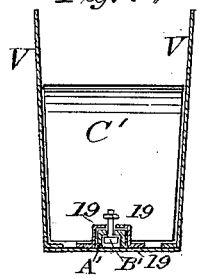
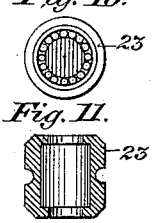
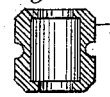
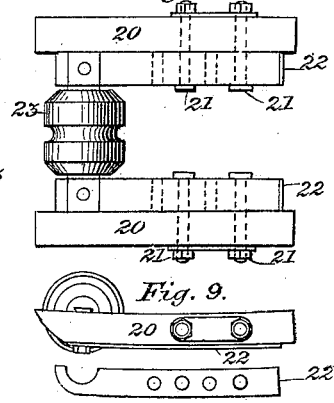
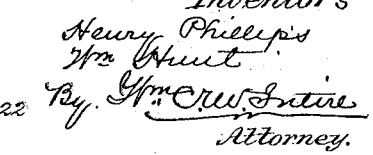

No. 632,202. Patented Aug. 29, 1899.
H. PHILLIPS & W. HUNT.
CAR LOADER.
(Application filed Dec. 22, 1898.)
(No Model.) 6 Sheets—Sheet 5.
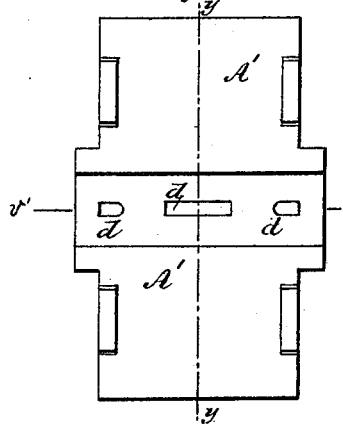
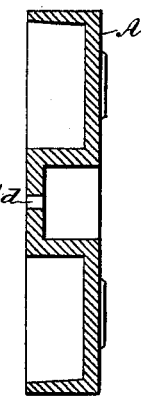
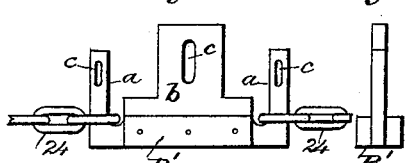
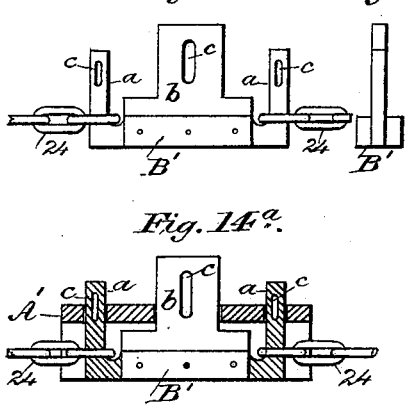
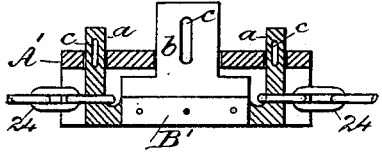
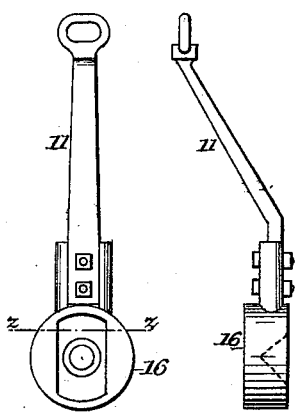
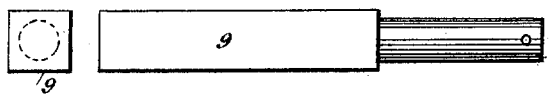
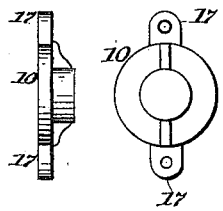
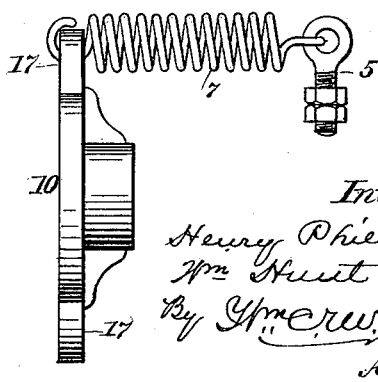
Witnesses:
T. C. Brecht
John Tyler
Inventors
Henry Phillips
Wm Hunt
By Wm C. R. W. Intire
Attorney.

No. 632,202. Patented Aug. 29, 1899.
H. PHILLIPS & W. HUNT.
CAR LOADER.
(Application filed Dec. 22, 1898.)
(No Model.) 6 Sheets—Sheet 6.
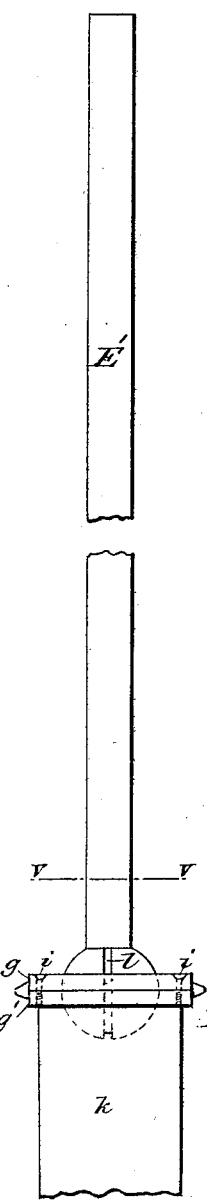
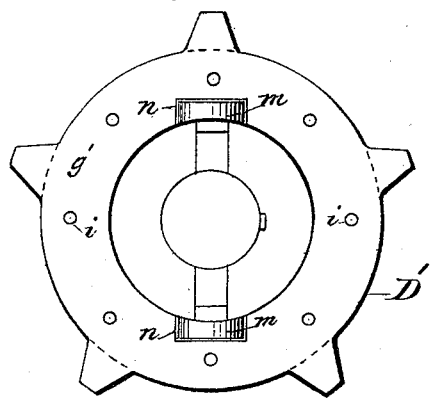
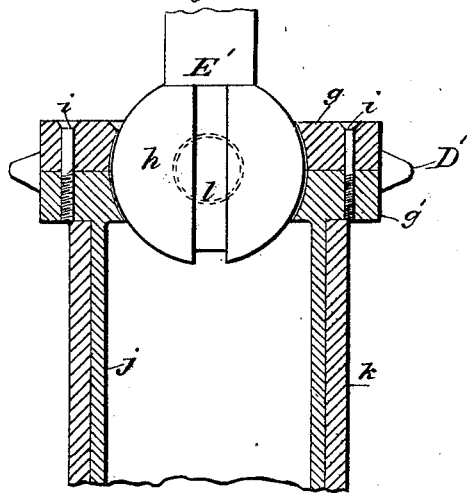
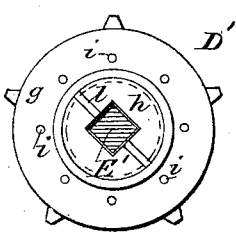
Witnesses:
Inventors
Henry Phillips
Wm Hunt
Attorney

UNITED STATES PATENT OFFICE.

HENRY PHILLIPS AND WILLIAM HUNT, OF OTTUMWA, IOWA.

CAR-LOADER.

SPECIFICATION forming part of Letters Patent No. 632,202, dated August 29, 1899.

Application filed December 22, 1898. Serial No. 700,023. (No model.)

*To all whom it may concern:*

Be it known that we, HENRY PHILLIPS and WILLIAM HUNT, citizens of the United States, residing at Ottumwa, in the county of Wapello and State of Iowa, have invented certain new and useful Improvements in Car-Loaders; and we do hereby declare the following to be a full, clear, and exact description of the invention, such as will enable others skilled in the art to which it appertains to make and use the same.

Our invention relates to certain new and useful improvements in car-loaders, and particularly in that type shown and described in Letters Patent granted to us November 3, 1896, No. 570,880.

In the patent referred to we have shown and described a hopper for receiving coal from an ordinary chute and said hopper arranged in fixed relation upon a secondary supporting frame or table, the latter capable of revoluble and reciprocating movement on a pedestal secured to the end of a primary longitudinally-movable frame.

One of the objects of our present invention contemplates dispensing with the secondary frame mounted upon the pedestal and intermediate of the hopper and the primary frame and to provide for the support of a longitudinally and revolubly movable hopper directly upon the pedestal, thus reducing the weight and cost of the machine and at the same time simplifying the manufacture.

Another object of our invention is to dispense with the folding sides of the hopper and end-gate, as shown and described in the Letters Patent referred to, and to so construct the sides of the improved hopper that they shall be immovably secured in position, and also so constructing the end-gate or pusher that it shall be all one rigid structure, thus not only simplifying the construction of the hopper sides and end-gate or pusher, but at the same time materially adding to the strength of the same.

Another object in view of our present invention is to dispense with the series of stop-holes employed to arrest the hopper at different points in its longitudinal progress and to so construct a combined table and hopper that it shall have a reciprocating movement about equal to its length and with stop or locking mechanism to automatically arrest and hold and also release the table-hopper at each end after it has reached its limit of movement.

Our present invention has as a further object to so locate the engine and the means of conveying power therefrom to the table-hopper and end-gate or pusher that the power will be utilized to the best advantage.

Another object had in view by our invention is to so construct and arrange the end-gate or pusher, hopper-bottom, and traveling chain that the chain in its travel shall always be out of contact with the coal lying upon the bottom of the hopper and that the end-gate or pusher shall be duly guided and held to its work.

Another object of our invention is to dispense with that portion of the power-transmitting chain which in the patent referred to travels longitudinally with the frame of the machine and to the center of the pedestal and to substitute therefor a rigid shaft and shaft-rotating mechanism, whereby the chain-wheel beneath the hopper is revolved and through it and the medium of a hopper-chain the end-gate or pusher is reciprocated and the hopper likewise is automatically and at will moved in either direction longitudinally, as will be hereinafter more fully described.

A further object of our invention is to provide an automatic locking and unlocking device for regulating the movements of the table-hopper to the end that when the end-gate or pusher is in motion delivering the coal the table-hopper will be held at rest, and when the end-gate or pusher has reached the limit of its travel in either direction it will automatically unlock the table-hopper, thus instantly transferring the power from the end-gate or pusher to the table-hopper and greatly increasing the working capacity.

With these ends and objects in view our invention consists in the peculiar features of construction and arrangement hereinafter more fully set forth and claimed.

In order that those skilled in the art to which our invention appertains may know how to make and use the same, we will proceed to describe the construction and operation of our improved car-loader, referring by letters and numerals to the accompanying drawings, in which—

Figure 1 is an end elevation of our improved machine in its relation to a car and showing the machine in the act of delivering a load to one end of the car, the side of the latter being broken away to show more clearly the relation of the loader with the car. Fig. 2 is a side elevation of the machine and an end elevation of the car, the latter being broken away to show the machine within the car receiving coal from an ordinary chute from the opposite side of the car-track and at the same time showing so far as the loader is concerned its working position within the car. Fig. 3 is a partial plan view showing in relief the power-transmitting shaft and the table-hopper. Fig. 3ª is a detail side view of the locking-bolt and operating-lever and connections by means of which the hopper is automatically locked and released. Fig. 4 is an end view of the loader, looking from the opposite direction to that illustrated at Fig. 1. Fig. 4ª is a top or plan view of the parts as shown at Fig. 3ª and with the lever shown in cross-section. Fig. 5 is a detail vertical section on the line $x\,x$ of Fig. 2. Fig. 6 is a top or plan view of the table-hopper with the end-gate or pusher centrally located. Fig. 7 is a side view of the table-hopper with the end-gate or pusher centrally located. Fig. 7ª is a cross-section on the line $w\,w$ of Fig. 6. Fig. 8 is a plan view of one of the chain-tighteners secured to the under side and at each end of the end table-hopper. Fig. 9 is a side view of the chain-tightener shown at Fig. 8 and also of the inside adjustable bearing of the chain-wheel. Fig. 10 is a cross-section of the idler chain-wheels. Fig. 11 is a longitudinal section of the idler chain-wheels. Fig. 12 is a plan view of the upper part of the draw-bar to which the end-gate or pusher is secured. Fig. 13 is a section taken at $y\,y$ of Fig. 12. Fig. 14 is a side view of the lower part of the draw-bar. Fig. 14ª is a longitudinal section on the line $v'\,v'$ of Fig. 12 of the draw-bar and with the lower portion shown at Fig. 14 in position and shown in elevation. Fig. 15 is an end view of the part of draw-bar shown in side elevation at Fig. 14. Fig. 16 is a side elevation of the lever which automatically locks the table-hopper as it reaches the limit of its movement in either direction longitudinally and automatically unlocks or releases the table-hopper as the end-gate or pusher approaches the limit of its longitudinal movement in either direction. Fig. 17 is a transverse elevation of the lever shown at Fig. 16. Fig. 18 is a longitudinal plan view of the stop-pin for locking the table-hopper. Fig. 19 is an end view of the square portion of the stop-pin. Fig. 20 is a section through the lever, taken on the line $z\,z$ of Fig. 16. Fig. 21 is a side and front view of a plate fitting over the lower end of lever shown at Fig. 16 to constitute means for a spring connection between the lever with its locking-pin and the table-hopper. Fig. 22 is a plan view, on enlarged scale, of the springs employed to hold the lever and its locking-pin in position. Fig. 23 represents side views at right angles to each other of the pins which wedge or force the lower end of the lever shown at Fig. 16 away from the pedestal to release the locking-pin from the side of the table-hopper. Fig. 24 is a plan of one of the disk-halves of the sprocket-chain wheel. Fig. 25 is a section on the line $w\,w$ of Fig. 6, but showing both disk-halves of the sprocket-chain wheel, also the hub and bearing of the sprocket-wheel and the driving-shaft, in elevation. Fig. 26 is a plan view, on reduced scale, of the sprocket-chain wheel, its bearing or box, and the driving-shaft. Fig. 27 is a cross-section on the line $v\,v$, Fig. 26; and Fig. 28 is a detail plan view showing the construction of the keys employed for connecting the universal ball-joint with the sprocket-wheel.

Similar letters and numerals of reference denote like parts in the several figures of the drawings.

A represents a suitable foundation, preferably of stone, built near the side of the tracks B.

C C are metal abutments or stands formed with bases D and strengthened by cross-bars E, and upon the stands C are arranged track wheels or rollers F in suitable boxes or bearings G.

I I are I-beams constituting the main frame of the machine, and they are suitably tied and braced in parallelism and have secured to the upper surfaces a hood J, which arches and protects the engine K, which, as shown, is located upon a suitable bed on the foundation A between the stands C C. A steam-cylinder L is mounted upon and secured to brackets or supports L', (see Fig. 1,) bolted to the stands C and connected by suitable and ordinary valves, so that steam may be admitted and exhausted from each side of a head on an ordinary piston, the stem $L^2$ of which is connected to a lug or arm M at the rear end of the I-beam frame I. (See Figs. 1 and 3.) The I-beams I rest upon the wheels or rollers F and travel longitudinally thereon and are held against vertical vibration by antifriction-wheels N. As steam is admitted at opposite sides of the piston-head the I-beam frame I will be correspondingly moved in one or the other direction in an obvious manner. The front end of the I-beam frame is rigidly secured and held together by a metal base O, (see Fig. 5,) with a circumferential ball-race near the top to receive antifriction-balls P. A frame or crown Q, having a disk bottom R secured thereto by screw-bolts S, confines the balls P in their race and is adapted to revolve upon the pedestal O and keep the crown and table-hopper from tipping from position in an obvious manner. The crown Q is formed with two parallel supports T, having lugs 1 2 3, the end lugs 1 and 3 constituting bearings for rollers U, (see Fig. 1,) upon which rest curved lateral flanges 4 on the sides of the table-hopper V, thus enabling the table-hopper to freely move longitudinally in either direction, as hereinafter described. The support T nearest to the front of the machine is provided with two short eyebolts 5, secured in place by nuts 6, and to these eyebolts are secured one end of coil-springs 7. (Shown on enlarged scale at Fig. 22 and hereinafter more fully described.) The lug 2 on the front support T is perforated with a square hole 8, through which reciprocates the square end of a stop or locking pin 9, (shown on enlarged scale at Fig. 18,) which automatically locks and releases the table-hopper as it is reciprocated upon the crown Q, as hereinafter described.

W is a bolt operated by a lever X and passing through a guide-lug into the wall of the crown Q and is designed to lock the latter against rotation in any given axial relation to the frame I.

The locking-pin 9 (shown at Fig. 18) is square at that portion which passes through the lug 2 (see Figs. 2, 3ª, 4ª, and 5) and round at the outer portion and passes centrally through a hub 16 at the lower end of a lever 11 and is secured therein by an ordinary cotter-pin 12. The interior disk face of this hub is formed with two V-shaped recesses 13 to receive the arrow-shaped ends 14 of two short bolts 15, (see Figs. 20 and 23,) the stems of which are cylindrical and are located within diametric recesses e e, Fig. 5, in the lug 2 on the crown Q. Between the cotter-pin 12 and the face of the hub 16 on the lever 11 is confined a plate 10, (see Fig. 21,) having diametric ears 17, which are perforated for connection with one end of the coil-springs 7, the opposite ends of which are connected with the eyebolts 5 on the table-hopper support T, said springs acting to hold the lever-hub 16 toward the lug 2, and consequently by reason of the annular shoulder on the locking-pin 9 the latter is forced into its recess or stop-holes near each end of the side of the hopper to lock the same in position, but when the lever 11 is vibrated upon the cylindrical portion of the locking-pin 9 the arrow-shaped heads 14 of the short bolts 15, contacting with the V-shaped recesses in the disk face of the lever-hub 10, forces the latter outward, and consequently the locking-pin 9 is withdrawn from its recess in the side of the hopper, so that the latter is free to be moved longitudinally in to bring the opposite end of the hopper into position to be locked by the locking-pin 9, it being understood that there is a locking recess or hole in the side of the hopper near each end thereof. The vibration of the lever and the withdrawal of the locking-pin 9 are automatically effected through the medium of a chain 18, one end of which is secured to the free end of lever 11 and the opposite end to the end-gate or pusher, hereinafter described, and arranged within the hopper, the length of the chain 18 being predeterminedly such that just before the end-gate or pusher reaches the limit of its longitudinal movement in either direction it will pull upon the chain, vibrate the lever 11, and cause the locking-pin to be withdrawn from its recess in the side of the hopper V, so that the latter, as will be presently described, will be free to be moved longitudinally in an opposite direction to that occupied by it when the locking-pin is released, and when it has reached the limit of such movement, the chain being slack, the coil-springs 7, pulling upon the hub of lever 11, will cause the latter to return to its normal position, and consequently the locking-pin will enter its recess in the side of the hopper and lock the same against movement until the end-gate or pusher reaches its limit of movement in an opposite direction to that already described.

The hopper V is made of steel plate and has a curved bottom or table, as clearly shown at Figs. 1, 2, 4, and 7, and consequently during its travel it moves in a correspondingly-curved direction, hence presenting itself always in the lowest position at the locality it receives coal from the coal-chute, and the point of delivery from the hopper being the highest point of its movement, and consequently the coal is piled higher in the ends of the car than would be the case if the path of movement of the hopper were in a horizontal line.

On the upper surface of the bottom of the hopper are riveted two Z-shaped bars 19, as clearly shown at Fig. 6, and they are so located with reference to each other as to provide a longitudinal slot, through which the draw-bar of the end-gate passes and by which it is guided. The chain which operates the end-gate or pusher is connected to the lower part of the draw-bar and travels in the lower portion of the slot and upon the upper surface of the hopper-bottom, thus being practically within a housing.

To each end of the bottom of the hopper bars 20 are riveted, each formed with a series of horizontal bolt-holes, in which are located bolts 21, which pass through bolt-holes in secondary bars 22, the outer ends of which constitute bearings for the axle or hub of chain-idlers 23, as clearly shown on enlarged scale at Figs. 8, 9, 10, and 11. The bolt-holes through the inside bars 22 are greater in number and closer together than the holes in the outer bars 20 in order that a greater range of adjustment of the bars 20 and 22 relatively to each other may be made to secure adjustment in turn of the idler chain-wheels 23 relatively to each other in order that any slack of the chain 24 may be taken up. The chain 24 is attached at each end to vertical lugs on the lower part of the draw-bar. The draw-bar is composed of two parts. The upper part A' is represented at Figs. 12 and 13 and the lower part B' at Figs. 14 and 15. The lower part is formed with three arms $a$ $a$ $b$, each having key or wedge slots $c$, and the upper part A' is constructed, as shown, with slots d, through which the arms a a b on the lower part B' pass. This upper part A' of the draw-bar is formed with a recess, as clearly shown at Fig. 13, in order that it may fit over the Z-plates centrally located on the hopper-bottom, and when the two parts A' B' have been securely connected by suitable wedges or keys placed in the slots c the upper part A' will rest upon the upper surface of the hopper-bottom and the lower part B' will lie within the slot or housing formed by the parallel Z-bars 19.

The end-gate or pusher C' (see Figs. 6, 7, and 7ª) is securely bolted to the upper part A' of the draw-bar, and the ends of the operating-chain 24, as hereinbefore stated, are connected to the arms a a of the lower part B', as clearly shown at Fig. 14, so that the draft of the chain is applied most advantageously for operating the end-gate or pusher C'. The chain 24 passes over the idlers 23 on the ends of the hoppers, thence over guiding-idlers 25, mounted in bearings 26 in the bottom R of the crown Q, (see Figs. 1, 4, 5, 6, and 7,) and thence around a sprocket-wheel D', driven by the shaft E'. This sprocket-wheel and its connection with the shaft E' will be presently explained in detail; but from what has already been explained it will be seen that as the ends of the chain 24 are attached, as before stated, to the arms c c of the lower portion B' draw-bar of the end-gate or pusher C the rotation of the sprocket-wheel D' in one or the other directions will accordingly pull the end-gate or pusher longitudinally along the hopper and force the coal in front of said pusher over the elevated end of the hopper and into the end of the car, and, as before explained, when the end-gate reaches the limit of its longitudinal movement the chain 18 is straightened and then vibrates the lever 11 and releases the locking-pin 9 from its recess or hole in the hopper, and the latter is then free to be moved longitudinally in the direction opposite to that it occupied as the coal therein was pushed out by the action of the end-gate or pusher. This movement of the hopper is accomplished through the following instrumentalities: The end-gate or pusher having reached a stop at the end of the hopper, the continued movement of the chain in the same direction which caused the movement of the end-gate necessarily pulls against that end of the hopper and draws the hopper bodily back in the direction of the arrow at Fig. 1, so as to bring the extended or elevated end of the hopper back and over the sprocket-wheel. While the hopper has been traveling in this reverse direction, coal is dumped from the chute G', Fig. 2, and the hopper is fully loaded again in front of the end-gate or pusher C', and the chain 18 having been slackened by the movement of the hopper the coil-springs 7, hereinbefore referred to, cause the lever on the locking-pin to be vibrated and the locking-pin to enter its recess or hole in the side of the hopper, and thus lock the latter in its new or reverse position.

The engine K (which is an ordinary reversible engine) is then reversed by the reversing-lever H', and the sprocket-wheel D' is rotated in a correspondingly-reversed direction, and the chain 24 then, in the manner already described, pulls the end-gate or pusher against the coal in the hopper and pushes it off into that end of the car opposite to where the original load of the hopper was dumped, and when the end-gate reaches its limit of movement it again causes the locking-pin to release the hopper, and the continued rotation of the sprocket-wheel pulls (through the medium of chain 18) the hopper backward, as already described, and it is loaded as before, and so on.

I will now proceed to describe the manner in which power and motion are given to the main driving-shaft E'. This shaft E', as clearly shown at Fig. 3, is square in cross-section, and the hub I' of the main gear J' is formed with a correspondingly-shaped axial hole to receive the shaft, and consequently fixed axial relation is established between the shaft and main gear. The hub of the main gear is sufficiently long each side of the gear and is cylindrical to constitute a journal which rotates in suitable boxes or bearings I² in cross-beams K' of the main frame. The free or rear end of the shaft E' is supported in any suitable support to prevent sagging or vibration of the same, and it is obvious that as the main frame I of the machine is moved longitudinally in either direction the shaft E' is free to move through the hub I' of the main gear. Rotary motion is imparted to the shaft from the engine K through the medium of two pitmen K, connected with wrist-pins on the wheels K³, secured to the opposite ends of a short shaft K⁴, rotating in suitable hanger-bearings bolted to the under sides of the cross-beams K', and keyed to the shaft K⁴ is a pinion K⁵, meshing with the main gear J', and consequently as the shaft K⁴ and pinion K⁵ are rotated in either direction the main gear J' and the shaft E' will be rotated in one or the other direction.

When a car to be loaded is properly located on the track between the supplying-chute G' and the loading-machine, and the hopper of the machine is in one or the other of its extreme longitudinal positions and locked, as shown, for instance, at Fig. 1, and the hopper is at an angle of forty-five degrees to the main frame as a result of the action of its having been previously removed from a car, or, if it is being initially worked, by having been turned by hand into such position, the main frame I is moved through the medium of the cylinder L and its piston connection with the frame toward the car, and until that end of the hopper which is immediately over the main frame passes the side of the car and into the door the main shaft E' is then rotated through the mechanism already described to such an extent as will reciprocate the hopper a sufficient distance to bring the extended end inside the vertical plane of the side of the door, and then the main frame is advanced so that the pedestal shall be central between the sides of the car, and the hopper is at the same time swiveled or turned in parallelism with the sides of the car. The hopper will then be in position to receive a load from the chute G'. To remove the main frame and hopper from a car, it is obvious that a reversal of the procedure just described will produce the desired result.

I will now proceed to describe the construction and arrangement of the parts by which connection is made between the front end of the main shaft E' and the sprocket-wheel D' and by means of which motion is transmitted to the sprocket-wheel D' and at the same time permitting the sprocket-wheel to rotate at different angles with the shaft as becomes necessary when the crown Q and table-hopper are turned to a proper position, as will be hereinafter described, for entering or withdrawing from the car. Special reference is here made to Figs. 24, 25, 26, 27, and 28.

The sprocket-wheel is composed of two disk-halves $g\ g'$, on one of which are formed the sprocket-teeth, or the teeth may be formed on a central ring and the latter clamped between the disk-halves $g\ g'$. The two parts of the sprocket-wheel are secured together after the sphere $h$ on the end of shaft E' has been properly located by screw-bolts $i$, duly countersunk, as shown at Fig. 25. The disk-half $g'$ is formed with a tubular hub $j$, which takes its bearing in a box $k$, formed with and depending from the crown Q, as shown in dotted lines at Fig. 4.

The spherical head or end $h$ of the shaft E' is formed with a circumferential groove or key-slot $l$ each side of the juncture with the shaft, and the said spherical head and shaft are keyed to the sprocket-wheel by means of two keys $m$, (see Fig. 28,) the short shanks of which fit within the groove $l$ in the head $h$, while the enlarged head portion of the keys $m$ fit within recesses $n$ in the inner circumference of the disk-half $g'$ of the sprocket-wheel, as clearly shown at Fig. 24.

From the construction and arrangement described it will be seen that the sprocket-wheel D' is rotated by the driving-shaft E' and that the former is permitted to move at an angle to the shaft each side of the plane of the shaft E' when the crown Q is rotated, as hereinbefore explained, to permit the hopper to enter and withdraw from the car.

Having described the construction and operation of our improved car-loader, what we claim as new, and desire to secure by Letters Patent, is—

1. In a car-loading machine, a longitudinally-movable frame adapted to move into and out of a car, a revoluble pedestal mounted on the end of said frame, a hopper mounted directly upon the revoluble pedestal and adapted to travel across the axis of said pedestal in combination with suitable means for moving the frame longitudinally, and means for forcing a load carried by the hopper out of the same, substantially as hereinbefore set forth.

2. In a car-loading machine a longitudinally-movable supporting-frame, a pedestal located at one end of said frame and a hopper mounted directly upon said pedestal and adapted to longitudinal and revoluble movement thereon, in combination with means for forcing the contents of the hopper over and out of either end thereof, substantially as hereinbefore set forth.

3. In a car-loading machine a movable pedestal and a hopper mounted thereon and adapted to reciprocate and revolve directly upon said pedestal, in combination with an end-gate or pusher located within said hopper, and means for moving said end-gate or pusher in either direction longitudinally substantially as and for the purposes set forth.

4. In combination with the reciprocating hopper mounted upon a movable pedestal and an end-gate or load-pusher movable longitudinally within the hopper, means intermediate of the end-gate or pusher and the hopper for automatically locking the same in a fixed relation with the pedestal and releasing the same, substantially as and for the purposes described.

5. The hopper having Z-plates riveted centrally and longitudinally thereof as described to form a slot and housing, in combination with a draw-bar composed of the two parts A', B', secured together as described, and to the end-gate or pusher C', and the chain 24 secured to the arms $a\ a$ of the part B' and adapted to move the end-gate in either direction as hereinbefore set forth.

6. In combination with the hopper, pedestal and crown, and the draw-bar and end-gate or pusher constructed and arranged as described, the lever 11, with V-shaped recesses 13, the arrow-shaped bolts 14 15, locking-pin 9, and chain 18, connected at one end to the lever 11, and at the opposite end to the end-gate or pusher C', whereby the hopper is automatically locked and released as hereinbefore set forth.

7. The pedestal O, secured to the movable frame I, and formed with a race for the antifriction-balls P, in combination with the crown Q, and disk-bottom R, the crown and disk-bottom being separably connected by screw-bolts S, substantially as and for the purposes described.

8. In combination with the rotatory crown Q and longitudinally-movable hopper thereon the driving-shaft E having the spherical head $h$ keyed to the sprocket-wheel D' in the manner described whereby the sprocket-wheel may be rotated at different angles to the plane of the driving-shaft, substantially as hereinbefore set forth.

9. The sprocket-wheel D' made in disk-sections bolted together and formed with diametric recesses $n$, in combination with the shaft E with spherical head $h$ having circumferential groove $l$ and keys $m$ constructed as described and located in the recesses $n$, and groove $l$, substantially as shown and described.

10. The hopper V provided with flange curved plates or ribs 4, on each side in combination with the supporting-crown Q and friction-wheels U, substantially as and for the purpose set forth.

11. In combination with the hopper, the reciprocating end-gate or pusher and a chain for moving the end-gate or hopper, means for confining and protecting the chain, and guiding the end-gate or pusher substantially as set forth.

In testimony whereof we affix our signatures in presence of two witnesses.

HENRY PHILLIPS.
WILLIAM HUNT.

Witnesses:
W. M. EDWARDS,
GEO. B. SIMMONS.